(12) United States Patent
McKenzie et al.

(10) Patent No.: US 11,834,914 B2
(45) Date of Patent: Dec. 5, 2023

(54) QUICK COUPLING DRILL PIPE CONNECTOR

(71) Applicant: NATIONAL OILWELL VARCO, L.P., Houston, TX (US)

(72) Inventors: Andrew Ian McKenzie, Cypress, TX (US); Dominick Mancuso, Tomball, TX (US)

(73) Assignee: NATIONAL OILWELL VARCO, L.P., Houston, TX (US)

( * ) Notice: Subject to any disclaimer, the term of this patent is extended or adjusted under 35 U.S.C. 154(b) by 380 days.

(21) Appl. No.: 16/786,345

(22) Filed: Feb. 10, 2020

(65) Prior Publication Data
US 2021/0246738 A1    Aug. 12, 2021

(51) Int. Cl.
| | |
|---|---|
| *F16L 15/08* | (2006.01) |
| *E21B 17/043* | (2006.01) |
| *F16L 37/252* | (2006.01) |

(52) U.S. Cl.
CPC ............ *E21B 17/043* (2013.01); *F16L 15/08* (2013.01); *F16L 37/252* (2013.01)

(58) Field of Classification Search
CPC ...... E21B 17/043; F16L 15/08; F16L 37/2445
USPC .......................................... 285/391, 386, 330
See application file for complete search history.

(56) References Cited

U.S. PATENT DOCUMENTS

| | | | | |
|---|---|---|---|---|
| 600,988 | A | * | 3/1898 | Hayes .................... E21B 17/046 285/332.1 |
| 1,386,210 | A | * | 8/1921 | Thomas ................. E21B 17/046 285/376 |
| 1,494,524 | A | * | 5/1924 | Adamson ................. F41A 21/00 285/391 |
| 1,589,781 | A | * | 6/1926 | Anderson ............. F16L 15/006 285/330 |
| 1,818,278 | A | | 8/1931 | Siler |
| 2,109,344 | A | * | 2/1938 | Selger ................. F16L 19/0225 285/330 |

(Continued)

FOREIGN PATENT DOCUMENTS

| | | |
|---|---|---|
| CA | 2911388 | 11/2014 |
| CA | 2855105 | 12/2015 |

(Continued)

OTHER PUBLICATIONS

"U.S. Appl. No. 16/836,365, Notice of Allowance dated Nov. 3, 2021", 7 pgs.

(Continued)

*Primary Examiner* — David Bochna
(74) *Attorney, Agent, or Firm* — Schwegman Lundberg & Woessner, P.A.

(57) ABSTRACT

A quick connect pipe connection for drill pipe may include a box end having an annular end surface that gives way internally to a receiving portion and externally to an engagement portion. The connection may also include a pin end configured for rotationally and longitudinally engaging the box end. The pin end may include a tapered portion configured for longitudinal insertion into the receiving portion and resisting relative rotation between the box end and the pin end. The pin end may also include a collar configured for sleeving over the engagement portion of the box end and resisting relative longitudinal motion between the box end and the pin end.

13 Claims, 6 Drawing Sheets

(56) References Cited

U.S. PATENT DOCUMENTS

| | | | |
|---|---|---|---|
| 2,314,867 A * | 3/1943 | Boynton | E21B 17/046 |
| | | | 285/330 |
| 2,531,930 A | 11/1950 | Woolslayer et al. | |
| 2,615,681 A | 10/1952 | True | |
| 2,735,556 A | 2/1956 | Stone | |
| 2,885,096 A | 5/1959 | De | |
| 2,946,464 A | 7/1960 | Guier | |
| 3,225,949 A | 12/1965 | Erickson et al. | |
| 3,272,365 A | 9/1966 | Stevens | |
| 3,361,453 A * | 1/1968 | Brown | E21B 17/046 |
| | | | 285/332 |
| 3,533,516 A | 10/1970 | Guier | |
| 3,615,027 A | 10/1971 | Ham | |
| 3,623,753 A * | 11/1971 | Henry | E21B 17/043 |
| | | | 403/364 |
| 3,747,789 A | 7/1973 | Shipley et al. | |
| 3,768,663 A | 10/1973 | Turner et al. | |
| 3,840,128 A | 10/1974 | Swoboda et al. | |
| 3,877,583 A | 4/1975 | Bokenkamp | |
| 3,921,823 A | 11/1975 | Bourree et al. | |
| 3,976,207 A | 8/1976 | Schultz | |
| 3,994,350 A | 11/1976 | Smith et al. | |
| 4,042,123 A | 8/1977 | Sheldon et al. | |
| 4,117,941 A | 10/1978 | Mccleskey, Jr. et al. | |
| 4,126,348 A | 11/1978 | Palmer | |
| 4,269,554 A | 5/1981 | Jackson | |
| 4,274,778 A | 6/1981 | Putnam et al. | |
| 4,289,442 A | 9/1981 | Stevens | |
| 4,348,920 A | 9/1982 | Boyadjieff | |
| 4,397,605 A | 8/1983 | Cowgill et al. | |
| 4,531,875 A | 7/1985 | Krueger | |
| 4,591,006 A | 5/1986 | Hutchison et al. | |
| 4,621,974 A | 11/1986 | Krueger | |
| 4,680,519 A | 7/1987 | Chand et al. | |
| 4,715,761 A | 12/1987 | Berry et al. | |
| 4,738,321 A | 4/1988 | Olivier | |
| 4,846,357 A | 7/1989 | Sholl et al. | |
| 4,899,095 A | 2/1990 | Kishi et al. | |
| 5,038,871 A | 8/1991 | Dinsdale | |
| 5,211,251 A | 5/1993 | Woolslayer | |
| 5,494,320 A * | 2/1996 | Cerruti | F16L 19/0225 |
| | | | 285/332 |
| 5,813,286 A | 9/1998 | Hansen | |
| 5,921,329 A | 7/1999 | Armstrong | |
| 6,047,771 A | 4/2000 | Roeynestad | |
| 6,260,646 B1 | 7/2001 | Fernandez et al. | |
| 6,412,576 B1 | 7/2002 | Meiners | |
| 6,460,900 B1 * | 10/2002 | Bakke | E21B 17/046 |
| | | | 285/330 |
| 7,137,616 B2 | 11/2006 | Kysely | |
| 7,219,744 B2 | 5/2007 | Pietras | |
| 7,249,639 B2 | 7/2007 | Belik | |
| 7,341,281 B2 * | 3/2008 | Guesnon | E21B 17/085 |
| | | | 285/402 |
| 7,370,707 B2 | 5/2008 | Mcdaniel et al. | |
| 7,390,032 B2 * | 6/2008 | Hughes | E21B 17/046 |
| | | | 285/914 |
| 7,493,960 B2 * | 2/2009 | Leising | E21B 17/04 |
| | | | 166/242.6 |
| 7,726,929 B1 | 6/2010 | Orgeron | |
| 7,905,311 B2 | 3/2011 | Brown | |
| 7,946,795 B2 | 5/2011 | Orgeron | |
| 7,984,757 B1 | 7/2011 | Keast et al. | |
| 8,074,484 B2 | 12/2011 | Denkmeier et al. | |
| 8,191,637 B2 | 6/2012 | Havinga | |
| 8,210,269 B2 | 7/2012 | Hudson et al. | |
| 8,317,448 B2 | 11/2012 | Hankins et al. | |
| 8,504,206 B2 | 8/2013 | Fudaba et al. | |
| 8,550,761 B2 | 10/2013 | Belik et al. | |
| 8,690,508 B1 | 4/2014 | Orgeron | |
| 9,133,968 B2 * | 9/2015 | Elrick | E21B 17/046 |
| 9,291,010 B1 | 3/2016 | Barnes | |
| 9,388,923 B2 * | 7/2016 | Romano | F16L 19/025 |
| 9,706,185 B2 | 7/2017 | Ellis | |
| 9,845,645 B2 * | 12/2017 | Hughes | E21B 17/028 |
| 10,047,908 B1 | 8/2018 | Bohle, II et al. | |
| 10,053,934 B2 | 8/2018 | Keogh et al. | |
| 10,190,374 B2 | 1/2019 | Bowley et al. | |
| 10,246,952 B2 | 4/2019 | Trydal et al. | |
| 10,384,907 B2 | 8/2019 | Upmeier et al. | |
| 10,612,322 B2 | 4/2020 | Doyon | |
| 10,794,126 B2 | 10/2020 | Magnuson | |
| 10,988,994 B2 | 4/2021 | Clarke et al. | |
| 10,995,564 B2 | 5/2021 | Miller et al. | |
| 11,035,183 B2 | 6/2021 | Donnally et al. | |
| 11,220,888 B2 | 1/2022 | Ocegueda-Hernandez et al. | |
| 11,274,508 B2 | 3/2022 | McKenzie et al. | |
| 11,352,843 B2 | 6/2022 | Callaghan | |
| 11,365,592 B1 | 6/2022 | Moon et al. | |
| 11,613,940 B2 | 3/2023 | Mckenzie et al. | |
| 2002/0175519 A1 * | 11/2002 | Mack | F16L 15/08 |
| | | | 285/330 |
| 2003/0159854 A1 | 8/2003 | Simpson et al. | |
| 2004/0057815 A1 | 3/2004 | Woolslayer et al. | |
| 2005/0055132 A1 | 3/2005 | Matsumoto et al. | |
| 2005/0113971 A1 | 5/2005 | Zhang et al. | |
| 2005/0126792 A1 | 6/2005 | Berry | |
| 2006/0081379 A1 | 4/2006 | Fehres et al. | |
| 2006/0104747 A1 | 5/2006 | Zahn et al. | |
| 2006/0124316 A1 | 6/2006 | Pietras | |
| 2006/0231344 A1 | 10/2006 | Drzewiecki | |
| 2006/0249292 A1 | 11/2006 | Guidry | |
| 2007/0062705 A1 | 3/2007 | Schats et al. | |
| 2007/0114069 A1 | 5/2007 | Hooper et al. | |
| 2007/0228671 A1 | 10/2007 | Norton | |
| 2008/0136203 A1 | 6/2008 | Krijnen et al. | |
| 2008/0202812 A1 | 8/2008 | Childers et al. | |
| 2008/0238095 A1 | 10/2008 | Yater et al. | |
| 2008/0296065 A1 | 12/2008 | Standal | |
| 2009/0283324 A1 | 11/2009 | Konduc et al. | |
| 2010/0163247 A1 | 7/2010 | Wright et al. | |
| 2010/0193198 A1 | 8/2010 | Murray et al. | |
| 2010/0303586 A1 | 12/2010 | Hankins et al. | |
| 2011/0079434 A1 | 4/2011 | Belik et al. | |
| 2011/0120730 A1 | 5/2011 | Clasen et al. | |
| 2011/0147009 A1 * | 6/2011 | Dupal | E21B 17/043 |
| | | | 166/380 |
| 2011/0226485 A1 | 9/2011 | Seneviratne et al. | |
| 2012/0018222 A1 | 1/2012 | Hankins et al. | |
| 2012/0259337 A1 | 10/2012 | Del Rio et al. | |
| 2013/0075114 A1 | 3/2013 | Dekker et al. | |
| 2013/0142607 A1 | 6/2013 | Ditzler | |
| 2013/0146305 A1 * | 6/2013 | Dupal | E21B 17/043 |
| | | | 166/380 |
| 2014/0050522 A1 * | 2/2014 | Slaughter, Jr. | E21B 17/043 |
| | | | 403/342 |
| 2014/0054089 A1 | 2/2014 | Sondervik | |
| 2014/0090856 A1 | 4/2014 | Pratt et al. | |
| 2014/0097027 A1 | 4/2014 | Marica et al. | |
| 2014/0145408 A1 | 5/2014 | Midas et al. | |
| 2014/0202769 A1 | 7/2014 | Magnuson | |
| 2015/0053424 A1 | 2/2015 | Wiens et al. | |
| 2015/0127152 A1 | 5/2015 | Nammoto et al. | |
| 2015/0148952 A1 | 5/2015 | Shiratsuchi | |
| 2015/0232272 A1 | 8/2015 | Magnuson | |
| 2015/0272579 A1 | 10/2015 | Leimbach et al. | |
| 2015/0273688 A1 | 10/2015 | Harada et al. | |
| 2015/0275596 A1 | 10/2015 | Hickie | |
| 2015/0283704 A1 | 10/2015 | Watanabe | |
| 2015/0330162 A1 | 11/2015 | Magnuson et al. | |
| 2016/0060979 A1 | 3/2016 | Magnuson | |
| 2016/0115745 A1 | 4/2016 | Bisel | |
| 2016/0145954 A1 | 5/2016 | Helms et al. | |
| 2016/0160586 A1 | 6/2016 | Keogh et al. | |
| 2016/0168929 A1 | 6/2016 | Magnuson et al. | |
| 2016/0201408 A1 | 7/2016 | Little et al. | |
| 2017/0067303 A1 | 3/2017 | Thiemann et al. | |
| 2017/0172295 A1 | 6/2017 | Tropper | |
| 2017/0204687 A1 | 7/2017 | Yorga et al. | |
| 2017/0232620 A1 | 8/2017 | Kalb et al. | |
| 2017/0234088 A1 | 8/2017 | Orr et al. | |
| 2018/0171724 A1 * | 6/2018 | Daigle | E21B 17/043 |
| 2018/0238120 A1 * | 8/2018 | Patterson | E21B 17/043 |

(56) References Cited

U.S. PATENT DOCUMENTS

| | | |
|---|---|---|
| 2018/0245408 A1 | 8/2018 | Keogh et al. |
| 2018/0328112 A1 | 11/2018 | Berry et al. |
| 2018/0334865 A1 | 11/2018 | Miller et al. |
| 2019/0017334 A1 | 1/2019 | Loeyning et al. |
| 2019/0063649 A1* | 2/2019 | Snyder, II ............. E21B 17/043 |
| 2019/0143532 A1 | 5/2019 | Cutkosky et al. |
| 2019/0145197 A1 | 5/2019 | Callaghan |
| 2019/0309585 A1 | 10/2019 | Miller et al. |
| 2019/0352982 A1 | 11/2019 | Arefi et al. |
| 2020/0032597 A1 | 1/2020 | Jorgic et al. |
| 2020/0040673 A1 | 2/2020 | Donnally et al. |
| 2020/0040674 A1 | 2/2020 | Mckenzie et al. |
| 2021/0293099 A1 | 9/2021 | Carnegie et al. |
| 2021/0301602 A1 | 9/2021 | Mckenzie et al. |
| 2022/0145704 A1 | 5/2022 | Mckenzie |
| 2022/0178215 A1 | 6/2022 | Donnally et al. |

FOREIGN PATENT DOCUMENTS

| | | |
|---|---|---|
| CN | 202064839 | 12/2011 |
| CN | 102979465 | 3/2013 |
| CN | 103410458 | 11/2013 |
| CN | 104976322 | 10/2015 |
| CN | 105113983 | 12/2015 |
| CN | 108266139 | 7/2018 |
| CN | 110792399 | 2/2020 |
| EP | 1510302 | 3/2005 |
| EP | 1953334 | 8/2008 |
| GB | 2091788 | 8/1982 |
| GB | 2532267 | 5/2016 |
| JP | H09137689 A | 5/1997 |
| NO | 20151648 | 12/2015 |
| WO | 8800274 | 1/1988 |
| WO | 9958811 | 11/1999 |
| WO | 0123701 | 4/2001 |
| WO | 2004018829 | 3/2004 |
| WO | 2007143842 | 12/2007 |
| WO | 2013082172 | 6/2013 |
| WO | 2014179730 | 11/2014 |
| WO | WO-2015/043740 A1 | 4/2015 |
| WO | 2016024859 | 2/2016 |
| WO | 2016197255 | 12/2016 |
| WO | 2017039996 | 3/2017 |
| WO | 2017087595 | 5/2017 |
| WO | 2017190120 | 11/2017 |
| WO | 2017193204 | 11/2017 |
| WO | 2019195651 | 10/2019 |
| WO | 2020028852 | 2/2020 |
| WO | 2020028853 | 2/2020 |
| WO | 2020028856 | 2/2020 |
| WO | 2020028858 | 2/2020 |
| WO | WO-2020/028853 A9 | 2/2020 |
| WO | 2020123399 | 6/2020 |
| WO | WO-2020151386 A1 | 7/2020 |
| WO | 2020160440 | 8/2020 |
| WO | WO-2020172407 A1 | 8/2020 |
| WO | WO-2021/203122 A1 | 10/2021 |
| WO | 2021226622 | 11/2021 |
| WO | 2022016168 A1 | 1/2022 |
| WO | 2022170302 | 8/2022 |

OTHER PUBLICATIONS

"International Application Serial No. PCT/US2021/070786, International Search Report dated Nov. 9, 2021", 4 pgs.
"International Application Serial No. PCT/US2021/070786, Written Opinion dated Nov. 9, 2021", 7 pgs.
"U.S. Appl. No. 16/098,160, Response filed Dec. 14, 2021 to Non Final Office Action dated Sep. 15, 2021", 8 pgs.
"U.S. Appl. No. 17/248,669, Examiner Interview Summary dated Dec. 17, 2021", 2 pgs.
"U.S. Appl. No. 17/248,669, Response filed Jan. 5, 2022 to Non Final Office Action dated Oct. 5, 2021", 8 pgs.
"U.S. Appl. No. 16/098,160, Advisory Action dated Aug. 10, 2021", 4 pgs.
"U.S. Appl. No. 16/098,160, Non Final Office Action dated Sep. 15, 2021", 8 pgs.
"U.S. Appl. No. 16/098,160, Response filed Aug. 27, 2021 to Advisory Action dated Aug. 10, 2021", 8 pgs.
"U.S. Appl. No. 17/248,669, Non Final Office Action dated Oct. 5, 2021", 8 pgs.
"International Application Serial No. PCT/US2020/019039, International Preliminary Report on Patentability dated Sep. 2, 2021", 6 pgs.
"International Application Serial No. PCT/US2021/070488, International Search Report dated Sep. 8, 2021", 4 pgs.
"International Application Serial No. PCT/US2021/070488, Written Opinion dated Sep. 8, 2021", 6 pgs.
"International Application Serial No. PCT/US2021/070786, Invitation to Pay Additional Fees dated Sep. 1, 2021", 2 pgs.
"U.S. Appl. No. 16/098,160, Final Office Action dated May 27, 2021", 8 pgs.
"U.S. Appl. No. 16/098,160, Response filed Jul. 27, 2021 to Final Office Action dated May 27, 2021", 9 pgs.
"U.S. Appl. No. 16/836,365, Final Office Action dated May 4, 2021", 7 pgs.
"U.S. Appl. No. 16/836,365, Notice of Allowance dated Jul. 27, 2021", 7 pgs.
"U.S. Appl. No. 16/836,365, Response filed Apr. 22, 2021 to Non-Final Office Action dated Jan. 25, 2021", 8 pgs.
"U.S. Appl. No. 16/836,365, Response filed Jul. 2, 2021 to Final Office Action dated May 4, 2021", 7 pgs.
"International Application Serial No. PCT/CN2019/124443, International Preliminary Report on Patentability dated May 26, 2021", 4 pgs.
"International Application Serial No. PCT/US2021/070319, International Search Report dated May 31, 2021", 5 pgs.
"International Application Serial No. PCT/US2021/070319, Written Opinion dated May 31, 2021", 6 pgs.
"International Application Serial No. PCT/US2021/070488, Invitation to Pay Additional Fees dated Jun. 28, 2021", 2 pgs.
"Moveit—Kinematic constraints: Visibility Constraint Class Reference", [online]. [retrieved Apr. 21, 2021]. Retrieved from the Internet: <URL: http://docs.ros.org/en/hydro/api/moveit_core/html/classkinematic_constraints_1_1VisibilityConstraint.html>, (2021), 8 pgs.
"Moveit—Moving robots into the future", [online]. [archived Dec. 4, 2020]. Retrieved from the Internet: <URL: https://web.archive.org/web/20201204224545/https://moveit.ros.org/>, (2020), 7 pgs.
"U.S. Appl. No. 16/098,160, Advisory Action dated Jul. 22, 2020", 5 pgs.
"U.S. Appl. No. 16/098,160, Non Final Office Action dated Oct. 6, 2020", 8 pgs.
"U.S. Appl. No. 16/098,160, Response filed Aug. 24, 2020 to Advisory Action dated Jul. 22, 2020", 9 pgs.
"U.S. Appl. No. 16/375,927, Advisory Action dated Aug. 11, 2020", 6 pgs.
"U.S. Appl. No. 16/375,927, Non Final Office Action dated Sep. 24, 2020", 10 pgs.
"U.S. Appl. No. 16/375,927, Response filed Aug. 3, 2020 to Final Office Action dated Jun. 5, 2020", 11 pgs.
"U.S. Appl. No. 16/375,927, Response filed Sep. 8, 2020 to Advisory Action dated Aug. 11, 2020", 10 pgs.
"U.S. Appl. No. 16/431,540, Response Filed Sep. 10, 2020 to Non Final Office Action dated Jun. 10, 2020", 24 pgs.
"International Application Serial No. PCT/US2019/025942, Response filed Sep. 22, 2020 to Written Opinion dated Jul. 23, 2020", 4 pgs.
"International Application Serial No. PCT/US2019/025942, Written Opinion dated Jul. 23, 2020", 5 pgs.
"International Application Serial No. PCT/US2019/044974, Response filed Aug. 18, 2020 to Written Opinion dated Jun. 19, 2020", 4 pgs.
"International Application Serial No. PCT/US2019/044976, Response filed Aug. 25, 2020 to Written Opinion dated Jun. 26, 2020", 3 pgs.
"International Application Serial No. PCT/US2019/044976, Written Opinion dated Jun. 26, 2020", 4 pgs.

(56) References Cited

OTHER PUBLICATIONS

"International Application Serial No. PCT/US2019/044979, Response filed Aug. 25, 2020 to Written Opinion dated Jun. 26, 2020", 3 pgs.
"International Application Serial No. PCT/US2019/044979, Written Opinion dated Jun. 26, 2020", 4 pgs.
"International Application Serial No. PCT CA2017 000125, International Search Report dated Aug. 14, 2017", 3 pgs.
"International Application Serial No. PCT CA2017 000125, Written Opinion dated Aug. 14, 2017", 4 pgs.
"International Application Serial No. PCT CA2017 000125, International Preliminary Report on Patentability dated Nov. 22, 2018", 6 pgs.
"U.S. Appl. No. 16/098,160, Preliminary Amendment filed Nov. 1, 2018", 5 pgs.
"International Application Serial No. PCT US2019 025942, International Search Report dated Jun. 27, 2019", 4 pgs.
"International Application Serial No. PCT US2019 025942, Written Opinion dated Jun. 27, 2019", 9 pgs.
"U.S. Appl. No. 16/098,160, Non Final Office Action dated Sep. 30, 2019", 8 pgs.
"International Application Serial No. PCT US2019 044976, International Search Report dated Oct. 18, 2019", 5 pgs.
"International Application Serial No. PCT US2019 044976, Written Opinion dated Oct. 18, 2019", 8 pgs.
"International Application Serial No. PCT US2019 044979, International Search Report dated Oct. 22, 2019", 6 pgs.
"International Application Serial No. PCT US2019 044979, Written Opinion dated Oct. 22, 2019", 7 pgs.
"International Application Serial No. PCT US2019 044974, International Search Report dated Oct. 24, 2019", 6 pgs.
"International Application Serial No. PCT US2019 044974, Written Opinion dated Oct. 24, 2019", 6 pgs.
"International Application Serial No. PCT US2019 044983, International Search Report dated Oct. 22, 2019", 5 pgs.
"International Application Serial No. PCT US2019 044983, Written Opinion dated Oct. 22, 2019", 6 pgs.
"U.S. Appl. No. 16/098,160, Response filed Jan. 30, 2020 to Non Final Office Action dated Sep. 30, 2019", 8 pgs.
"U.S. Appl. No. 16/375,927, Non Final Office Action dated Feb. 28, 2020", 9 pgs.
"International Application Serial No. PCT CN2019 124443, International Search Report dated Mar. 5, 2020", 4 pgs.
"International Application Serial No. PCT CN2019 124443, Written Opinion dated Mar. 5, 2020", 4 pgs.
"U.S. Appl. No. 16/375,927, Examiner Interview Summary dated Apr. 24, 2020", 3 pgs.
"U.S. Appl. No. 16/098,160, Final Office Action dated Apr. 30, 2020", 7 pgs.
"International Application Serial No. PCT US2020 019039, International Search Report dated May 15, 2020", 2 pgs.
"International Application Serial No. PCT US2020 019039, Written Opinion dated May 15, 2020", 4 pgs.
"U.S. Appl. No. 16/375,927, Response filed May 27, 2020 to Non Final Office Action dated Feb. 28, 2020", 10 pgs.
"International Application Serial No. PCT US2019 025942, Response filed Feb. 5, 2020 to Written Opinion dated Feb. 27, 2019", 14 pgs.
"International Application Serial No. PCT US2019 025942, Written Opinion dated Feb. 24, 2020", 8 pgs.
"International Application Serial No. PCT US2019 025942, Response filed Apr. 23, 2020 to Written Opinion dated Apr. 23, 2020", 14 pgs.
"U.S. Appl. No. 16/375,927, Final Office Action dated Jun. 5, 2020", 10 pgs.
"U.S. Appl. No. 16/431,540, Non Final Office Action dated Jun. 10, 2020", 13 pgs.
"U.S. Appl. No. 16/098,160, Examiner Interview Summary dated Jun. 23, 2020", 3 pgs.
"International Application Serial No. PCT US2019 044976, Response filed Jun. 3, 2020 to Written Opinion dated Oct. 18, 2019", 11 pgs.
"International Application Serial No. PCT US2019 044979, Response filed Jun. 3, 2020 to Written Opinion dated Oct. 22, 2019", 12 pgs.
"International Application Serial No. PCT US2019 044974, Response filed Jun. 2, 2020 to Written Opinion dated Oct. 24, 2019", 13 pgs.
"U.S. Appl. No. 16/098,160, Response filed Jun. 30, 2020 to Final Office Action dated Apr. 30, 2020", 8 pgs.
"Canadian Application Serial No. 3,022,888, Voluntary Amendment filed Jul. 12, 2019", 10 pgs.
"International Application Serial No. PCT/US2019/044974, Written Opinion dated Jun. 19, 2020", 7 pgs.
"U.S. Appl. No. 16/098,160, Response filed Jan. 6, 2021 to Non Final Office Action dated Oct. 6, 2020", 7 pgs.
"U.S. Appl. No. 16/375,927, Corrected Notice of Allowability dated Jan. 26, 2021", 2 pgs.
"U.S. Appl. No. 16/375,927, Examiner Interview Summary dated Dec. 7, 2020", 7 pgs.
"U.S. Appl. No. 16/375,927, Notice of Allowance dated Jan. 1, 2021", 8 pgs.
"U.S. Appl. No. 16/375,927, Response filed Dec. 16, 2020 to Non Final Office Action dated Sep. 24, 2020", 8 pgs.
"U.S. Appl. No. 16/431,540, Examiner Interview Summary dated Jan. 19, 2021", 3 pgs.
"U.S. Appl. No. 16/431,540, Final Office Action dated Nov. 19, 2020", 10 pgs.
"U.S. Appl. No. 16/431,540, Notice of Allowance dated Feb. 11, 2021", 5 pgs.
"U.S. Appl. No. 16/431,540, Response filed Jan. 19, 2021 to Final Office Action dated Nov. 19, 2020", 11 pgs.
"U.S. Appl. No. 16/836,365, Non Final Office Action dated Jan. 25, 2021", 8 pgs.
"International Application Serial No. PCT/US2019/025942, International Preliminary Report on Patentability dated Oct. 30, 2020", 7 pgs.
"International Application Serial No. PCT/US2019/044974, International Preliminary Report on Patentability dated Nov. 11, 2020", 7 pgs.
"International Application Serial No. PCT/US2019/044976, Written Opinion dated Nov. 6, 2020", 6 pgs.
"International Application Serial No. PCT/US2019/044979, International Preliminary Report on Patentability dated Nov. 18, 2020", 7 pgs.
"International Application Serial No. PCT/US2019/044983, International Preliminary Report on Patentability dated Feb. 18, 2021", 8 pgs.
"International Application Serial No. PCT/US2019/124443, Response filed Nov. 24, 2020 to Written Opinion dated Mar. 5, 2020", 10 pgs.
"U.S. Appl. No. 16/098,160, Corrected Notice of Allowability dated Mar. 25, 2022", 4 pgs.
"International Application Serial No. PCT US2022 070377, International Search Report dated Mar. 25, 2022", 5 pgs.
"International Application Serial No. PCT US2022 070377, Written Opinion dated Mar. 25, 2022", 7 pgs.
"Saudia Arabian Application No. 521421161, Office Action dated Mar. 31, 2022", (w English Summary), 6 pgs.
"U.S. Appl. No. 16/431,533, Response Filed May 16, 2022 to Non Final Office Action dated Feb. 14, 2022", 11 pgs.
"U.S. Appl. No. 17/248,669, Corrected Notice of Allowability dated May 18, 2022", 3 pgs.
"European Application Serial No. 19758551.6, Communication Pursuant to Article 94(3) EPC dated Apr. 28, 2022", 4 pgs.
"European Application Serial No. 19752902.7, Communication Pursuant to Article 94(3) EPC dated May 3, 2022", 5 pgs.
"International Application Serial No. PCT US2021 070319, International Preliminary Report on Patentability dated May 10, 2022", 7 pgs.
"U.S. Appl. No. 17/248,669, Notice of Allowance dated Jan. 25, 2022", 8 pgs.
"U.S. Appl. No. 16/098,160, Notice of Allowance dated Feb. 3, 2022", 7 pgs.
"U.S. Appl. No. 17/248,669, Notice of Allowability dated Feb. 3, 2022", 5 pgs.
"U.S. Appl. No. 16/431,533, Non Final Office Action dated Feb. 14, 2022", 15 pgs.
"U.S. Appl. No. 17/248,669, 312 Amendment filed Mar. 2, 2022", 3 pgs.

(56) References Cited

OTHER PUBLICATIONS

"U.S. Appl. No. 17/248,669, PTO Response to Rule 312 Communication dated Mar. 9, 2022", 2 pgs.
"International Application Serial No. PCT US2022 070377, Written Opinion of the International Preliminary Search Authority dated Jan. 12, 2023", 8 pgs.
"International Application Serial No. PCT US2022 070377, International Preliminary Report on Patentability dated Apr. 4, 2023", 8 pgs.
"U.S. Appl. No. 17/310,672, Non Final Office Action dated Apr. 25, 2023", 12 pgs.
"U.S. Appl. No. 16/431,533, Final Office Action dated Jul. 21, 2022", 13 pgs.
"European Application Serial No. 19758551.6, Response filed Aug. 25, 2022 to Communication Pursuant to Article 94(3) EPC dated Apr. 28, 2022", 73 pgs.
"European Application Serial No. 19752902.7, Response filed Aug. 26, 2022 to Communication Pursuant to Article 94(3) EPC dated May 3, 2022", 70 pgs.
"U.S. Appl. No. 16/431,533, Examiner Interview Summary dated Sep. 14, 2022", 3 pgs.
"U.S. Appl. No. 16/431,533, Response filed Oct. 21, 2022 to Final Office Action dated Jul. 21, 2022", 9 pgs.
"U.S. Appl. No. 16/431,533, Notice of Allowance dated Nov. 7, 2022", 8 pgs.
"U.S. Appl. No. 16/431,533, Corrected Notice of Allowability dated Nov. 16, 2022", 2 pgs.
U.S. Appl. No. 17/250,548, filed Feb. 2, 2021, End Effectors for Automated Pipe Handling.
"U.S. Appl. No. 17/310,672, Response filed Jul. 18, 2023 to Non Final Office Action dated Apr. 25, 2023", 8 pgs.
"European Application Serial No. 21719521.3, Communication Pursuant to Article 94(3) EPC dated Jul. 17, 2023", 3 pgs.
"U.S. Appl. No. 17/310,672, Final Office Action dated Aug. 2, 2023", 13 pgs.
"U.S. Appl. No. 17/250,548, Restriction Requirement dated Aug. 21, 2023", 6 pgs.

\* cited by examiner

QUICK COUPLING DRILL PIPE CONNECTOR

TECHNOLOGICAL FIELD

The present disclosure relates to a system and method for splicing, coupling, connecting or terminating piping, tubing, or other elongated elements with a longitudinal lumen. More particularly, the present disclosure relates to a system and method for connecting lengths of manipulatable piping where active use and manipulation of the piping may occur after the connection is made. Still more particularly, the present disclosure relates to a system and method for connecting drill pipe and/or drill collar or other drilling lumens where manipulation of pipe stands and drilling of multiple lengths of pipe in the form of a pipe string may involve high levels of tension forces and rotational forces on the connection joints.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Drill pipe has gone unchanged for many years. A common drill pipe may include a box end and a pin end. The box end may include an end of a pipe having an enlarged cross-section with a threaded and tapered bore. The pin end may include an end of pipe having a threaded and tapered outer surface sized and shaped to fit into a box end of another length of pipe. The pin end may include a shoulder at a bottom of the tapered and threaded tip such that when the pin end threaded into the box end, the shoulder bottoms out, so to speak against the box end it is being secured to, thus, sealing the connection and resisting and/or preventing escape of fluids.

These types of connections may involve rotating the entire pipe segment several turns to fully engage the pin end in a box end of another length of pipe. Moreover, once fully engaged, the new joint may need to be torqued to assure full and proper engagement. This process of torqueing may be performed by an iron roughneck and may ensure that the joint is sufficient for purposes of the drill pipe specification to seal the pipe and to provide sufficient torsional and tensile integrity to perform as part of a drill string during drilling operations. The process of spinning new segments of pipe into other pipes either to create pipe stands or to add pipe stands or pipe segments to a drill string can be time consuming. That is, over the course of tripping drill pipe into and/or out of a well, a very high number of joints may need to be made up (for tripping in) or broken (for tripping out). Where each joint takes approximately 40 seconds, the amount of time making/breaking pipe joints can be significant. Moreover, the spinning process (e.g., spinning of the entire pipe segment or stand) to make/break the pipe joint can cause pipe whirl, which can be problematic for automating this process and can put a lot of stress and/or wear on the iron roughneck.

SUMMARY

The following presents a simplified summary of one or more embodiments of the present disclosure in order to provide a basic understanding of such embodiments. This summary is not an extensive overview of all contemplated embodiments, and is intended to neither identify key or critical elements of all embodiments, nor delineate the scope of any or all embodiments.

In one or more embodiments, a quick connect pipe connection for drill pipe may include a box end having an annular end surface that gives way internally to a receiving portion and externally to an engagement portion. The pipe connection may also include a pin end configured for rotationally and longitudinally engaging the box end. The pin end may include a tapered portion configured for longitudinal insertion into the receiving portion and resisting relative rotation between the box end and the pin end. The pin end may also include a collar configured for sleeving over the engagement portion of the box end and resisting relative longitudinal motion between the box end and the pin end.

In one or more embodiments, a quick connect drill pipe may include a body portion having an interior lumen, a box end secured at a first end of the body portion, and a pin end secured to a second end of the body portion opposite the first end. The box end may include an annular end surface that gives way internally to a receiving portion and externally to an engagement portion and the pin end may be configured for rotationally and longitudinally engaging an adjoining drill pipe. The pin end may include a tapered portion configured for longitudinal insertion into a receiving portion of the adjoining drill pipe and resisting relative rotation between the quick connect drill pipe and the adjoining pipe. The pin end may also include a collar configured for sleeving over an engagement portion of a box end of the adjoining pipe and resisting relative longitudinal motion between the quick connect drill pipe and the adjoining pipe.

In one or more embodiments, a method of connecting drill pipe on a drill rig may include stabbing a pin end of a drill pipe into a box end of an adjoining drill pipe and advancing a collar of the drill pipe over a box end of the adjoining drill pipe. The method may also include rotating the collar to secure the drill pipe to the adjoining drill pipe.

While multiple embodiments are disclosed, still other embodiments of the present disclosure will become apparent to those skilled in the art from the following detailed description, which shows and describes illustrative embodiments of the invention. As will be realized, the various embodiments of the present disclosure are capable of modifications in various obvious aspects, all without departing from the spirit and scope of the present disclosure. Accordingly, the drawings and detailed description are to be regarded as illustrative in nature and not restrictive.

BRIEF DESCRIPTION OF THE DRAWINGS

While the specification concludes with claims particularly pointing out and distinctly claiming the subject matter that is regarded as forming the various embodiments of the present disclosure, it is believed that the invention will be better understood from the following description taken in conjunction with the accompanying Figures, in which:

DETAILED DESCRIPTION

The present disclosure, in one or more embodiments, relates to a quick coupling joint for drill pipe that may improve the speed and efficiency of making up or breaking drill pipe connections on a drill rig. The joint may minimize and/or reduce the amount of rotation needed to make up or break drill pipe connections and may minimize, reduce, or eliminate the need to rotate the entire pipe segment or pipe stand to make up or break pipe joints. As such, the speed and efficiency of making/breaking drill pipe connections may be improved providing for faster and more efficient tripping operations relating to stand building and tripping of drill pipe into or out of a well.

Figure 1:
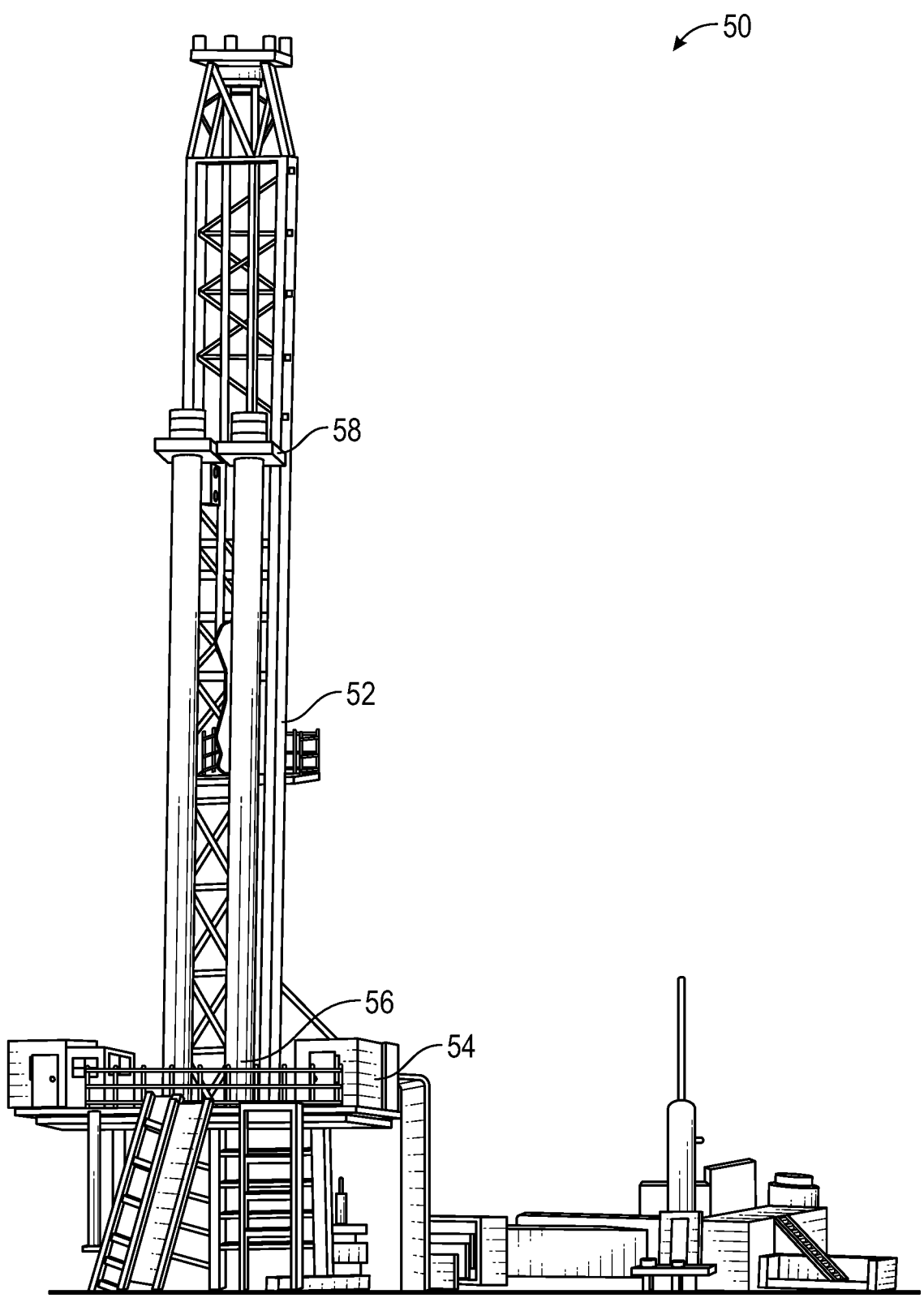
FIG. 1 is a perspective view of a drill rig containing multiple pipe stands made up of pipe segments with quick coupling joints, according to one or more embodiments.
Figure 2:
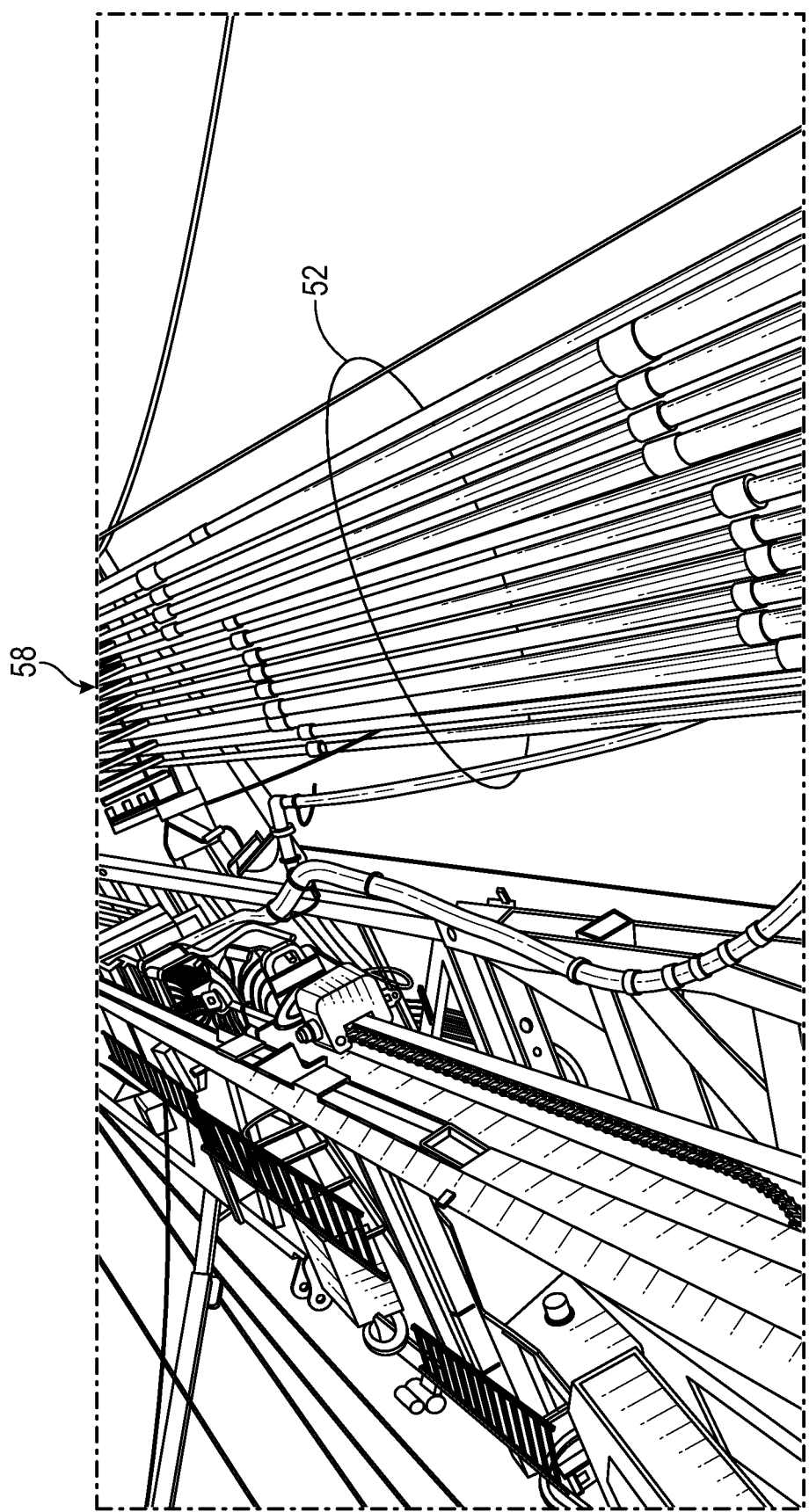
FIG. 2 is a close-up view of the pipe stands of FIG. 1.

Referring now to FIG. 1, a drill rig 50 is shown having stacks of pipe stands 52 arranged on the drill floor 54 and extending upward to a racking board 58. The pipe stands 52 may be created by loading pipe segments 100 onto the rig with a pipe cat, placing the pipe segments 100 into mouseholes, retrieving additional pipe segments 100 with the pipe cat, and joining the additional pipe segments 100 to the segment or segments 100 in the mousehole. Each connection between the pipe segments 100 may include a quick coupling joint 102 as described herein. Pipe stands 52 may be placed in a setback area 56 as shown and the top end of the pipe stand 52 may be tipped between fingers in a racking board 58 to store the pipe stand 52 for tripping operations. FIG. 2 shows another view of pipe stands 52 arranged in a setback area 56 and supported at their top end by a racking board 58. The pipe stands 52 may be used during tripping operations to lengthen or shorten the drill string in a well. When tripping in, a pipe stand 52 may be added to the top of the drill string and connected to the drill string with a quick coupling joint 102 as described herein. The drill string may be advanced downhole and an additional pipe stand 52 may be added to the top of the drill string. Again, a quick coupling joint 102, as described herein, may be used. In one or more embodiments, pipe stand lengths of 60 to 90 feet may be used. When tripping in drill string lengths of multiple miles, the number of joints 102 in the drill string may be very high and efficiencies associated with making/breaking these joints 102 may be very valuable.

Figure 3:
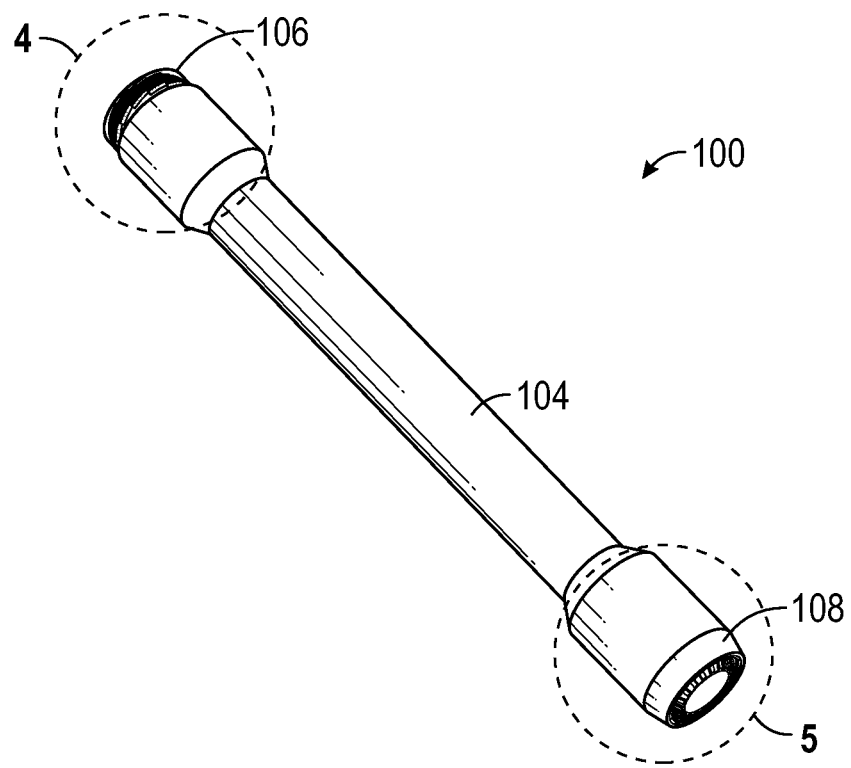
FIG. 3 is a perspective view of a pipe segment having quick coupling joint features at each end, according to one or more embodiments.

Referring now to FIG. 3, a drill pipe segment 100 having quick coupling joint features at each end is shown. The drill pipe segment 100 may be configured for use as a component of a pipe stand 52 and/or drill string. As shown, the pipe segment 100 may include a body portion 104, a box end 106, and a pin end 108. The body portion 104 may include an elongate tubular section. When viewed in cross-section, the elongate tubular section may include a circular outer surface defining an outer diameter and a circular inner surface defining an inner diameter, where the difference between an outer radius (e.g., ½ of the outer diameter) and an inner radius (e.g., ½ of the inner diameter) defines a wall thickness. The body portion may have outer diameters ranging from approximately 2 inches to approximately 10 inches, or approximately 4 inches to approximately 8 inches, or approximately 6 inches. The wall thickness may range from approximately 3/16 inch to approximately ¾ inch or from approximately ¼ inch to approximately ⅝ inch or from approximately ⅜ inch to approximately ½ inch.

Figure 4:
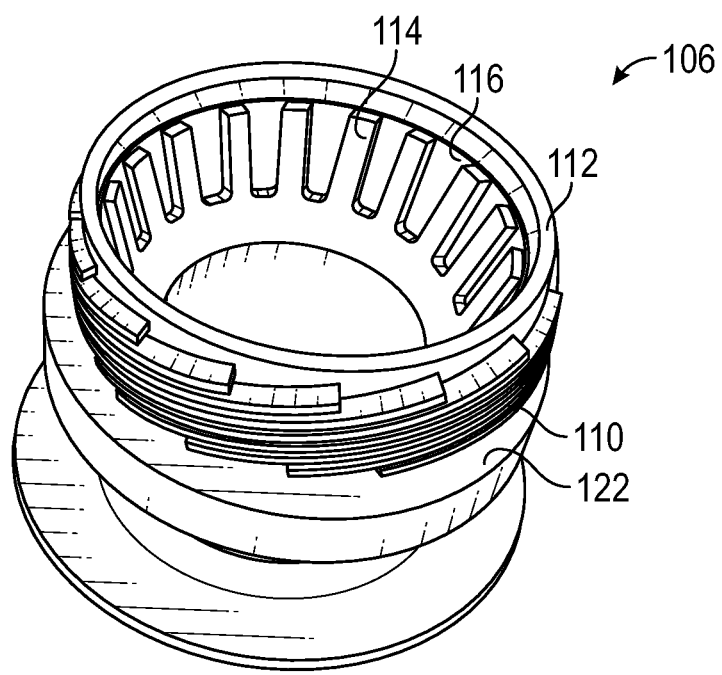
FIG. 4 is a box end of the pipe segment of FIG. 3, according to one or more embodiments.

With reference to FIG. 4, the box end 106 of the pipe segment 102 may be configured for receiving and coupling with a pin end 108 of an adjoining pipe segment. In addition to working with the pin end 108 to connect to an adjacent pipe segment 102, the box end 106 of the pipe segment 102 may be configured to resist tension forces tending to cause separation of the pipe segments 102 and to resist torsional forces tending to cause one pipe segment 102 to rotate relative to another pipe segment 102.

Figure 7:
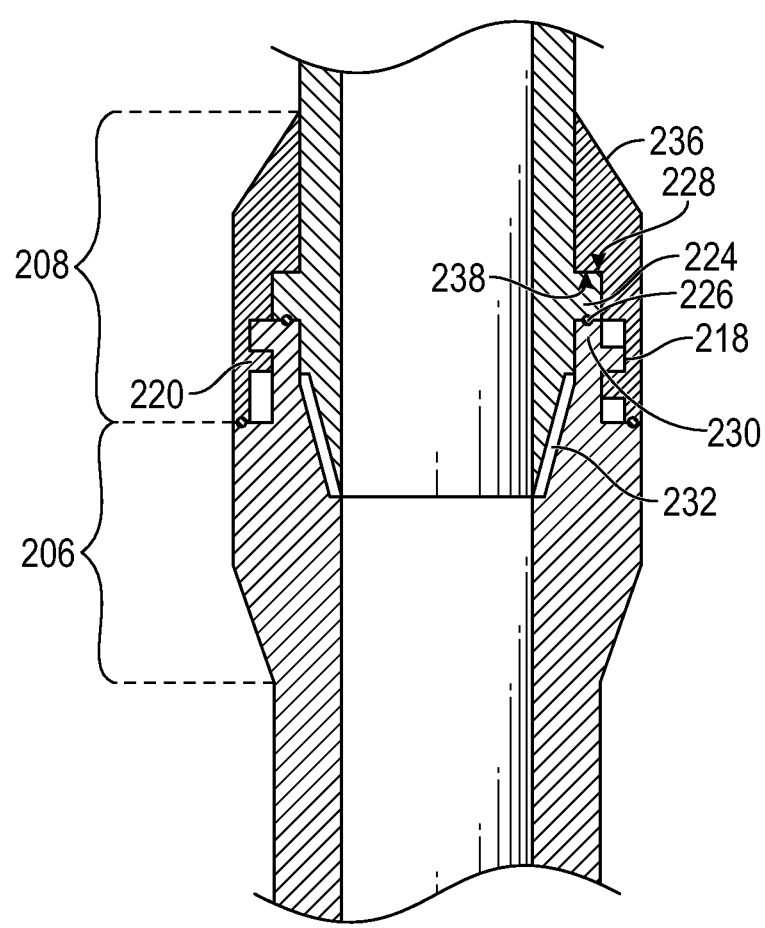
FIG. 7 is a cross-sectional view of a quick coupling joint similar to that of FIGS. 4-6, but including a union type locking coupling in lieu of threading, according to one or more embodiments.
Figure 8:
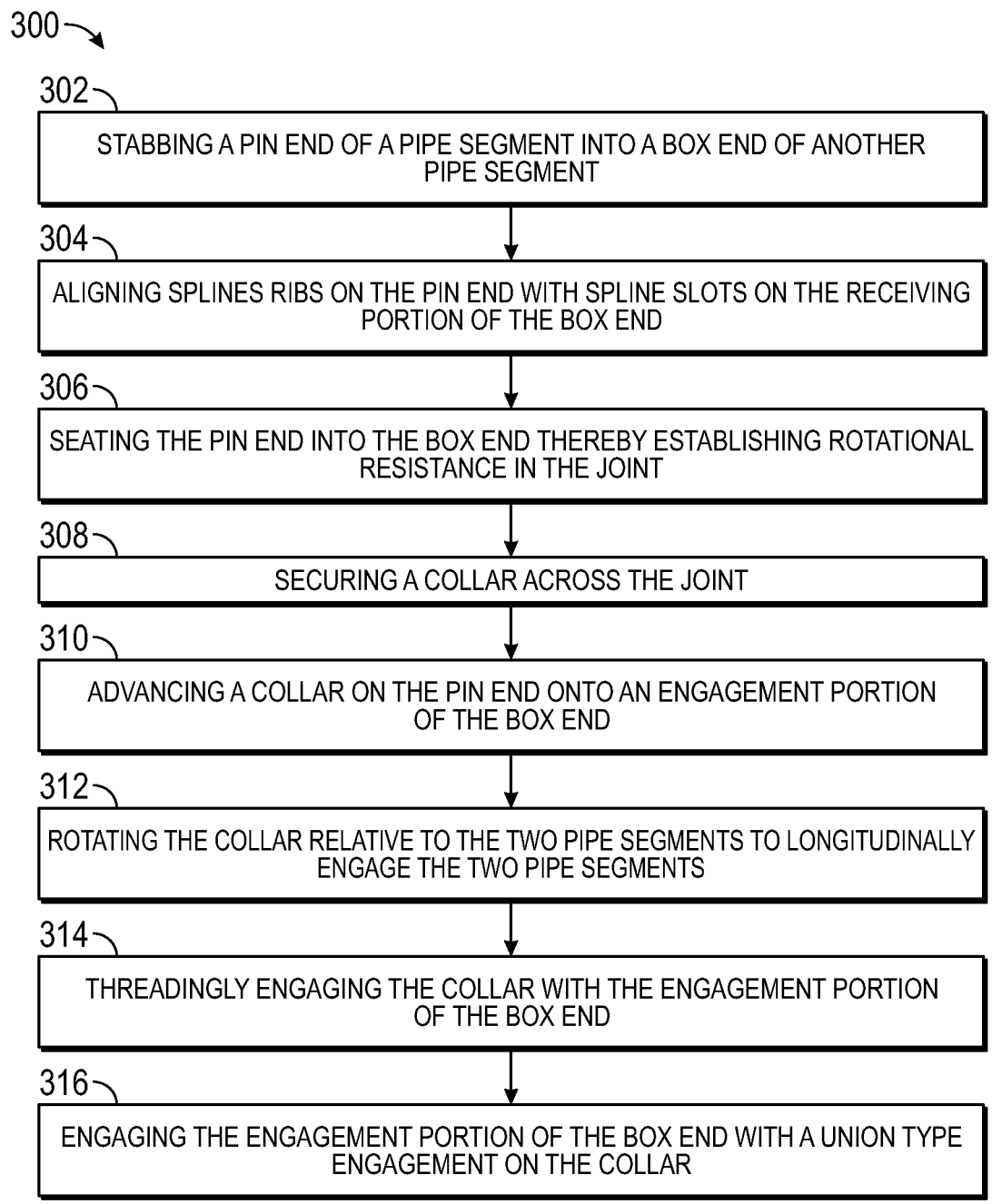
FIG. 8 is a diagram of a method of coupling pipe segments using a quick coupling joint as described herein, according to one or more embodiments.

The box end 106 of the pipe segment 102 may be an enlarged portion of the pipe segment 102 having an outer surface with a diameter larger than the outer diameter of the body portion 104 and an inner diameter larger than the inner diameter of the body portion 104. As shown in FIG. 7, the inner diameter of the box end 106 may be the same or similar to the outer diameter of the body portion 104 so as to receive a pin end 108 with a diameter similar to the body portion therein. The larger sized box end 106 may allow for insertion of the pin end 108 of an adjoining pipe segment without encroaching on the inner diameter of the body portion 104, for example, and allowing for a connection to be made that maintains the inner diameter of the pipe stand 52 or drill string. The box end 106 may be a bell-shaped box end, for example. As shown, the box end 106 may include an annular surface 112 on an end thereof that is adapted to engage a rib on a pin end 108 and create a seal between the two adjoining lengths of pipe. In a direction toward the body portion 104 of the pipe segment, the annular surface 112 may give way to a receiving portion 114 on an inside of the box end 106 and an engagement portion 110 on an outside of the box end 106.

The receiving portion 114 may be configured to receive a portion of the pin end 108 of an adjoining segment of pipe or an adjoining pipe stand. The receiving portion may also be configured to engage the pin end 108 in a manner that resists twisting and, thus, transfers torsional forces between the segments 100 or stands 52. As shown, the receiving portion 114 may include a conically shaped bore having a relatively large diameter near the annular surface 112 and a narrower diameter near the body portion 104 of the pipe segment 100. The receiving portion 114 may include a linearly tapering bore that changes over the length of the box end 106 from a diameter matching that of the inner diameter of the annular surface 112 at an end of the pipe segment and a diameter matching that of the inner diameter of body portion 104 at an interior side of the box end 106. The receiving portion 114 may include a surface pattern adapted to resist twisting of one pipe segment relative to a connected pipe segment. As shown, the inner surface may include a plurality of alternating spline slots and ribs 116, extending axially along the inside surface of the receiving portion 114 and adapted to receive spline ridges on the pin end. In one or more embodiments, the spline slots may have relatively wide mouths (e.g., at a distal end of the pipe segment) and may taper and get narrower as the splines slots extend downward and/or into the receiving portion toward the main bore of the pipe. This may allow for faster and more efficient alignment of spline ribs on a pin end with the spline slots on the box end, for example.

The engagement portion 110 may be configured to provide a tensile engaging surface for a collar on a pin end 108 to engage and pull or hold the respective pipe segments 100 together. As shown, in one or more embodiments, the engagement portion 110 may include a threaded surface configured to be engaged by internal threads on a collar, for example. In one or more embodiments, the size/thickness of the threads and the number of threads and/or the length of threading along the engagement portion may be sized and selected to withstand tensile forces in the drill string where, for example, several miles of drill string are suspended from a drill rig and the joints between pipe segments may be designed to withstand relatively high tensile forces. In other embodiments, as shown for example in FIG. 7, a union type locking coupling may be provided. That is, as shown, the outside surface of the engagement portion may include spaced apart locking ribs 218 where a lug 220 on an adjoining collar may be advanced over the engagement portion by passing the lugs 220 between the locking ribs 218. Rotation of the collar, then, may cause the lugs 220 to pass behind the locking ribs 218 and a detent may be provided to secure the collar in rotational position with the lugs 220 engaging the locking ribs 218.

Turning back now to FIG. 4, the engagement portion 110 may include a collar shelf 122 at a bottom end (e.g., the end opposite the annular surface) of the engagement portion. The collar shelf 122 may be sized to include an outer diameter that is the same or similar to the collar on the pin end 108, such that a smooth outer transition may be made between the collar and the box end 106. The shelf may, thus, abut or closely abut the collar and an outer surface created by the shelf may then taper inward as the box end extends longitudinally toward the body portion creating a conical outer surface that tapers down to meet the outer diameter of the body portion 104.

Figure 5:
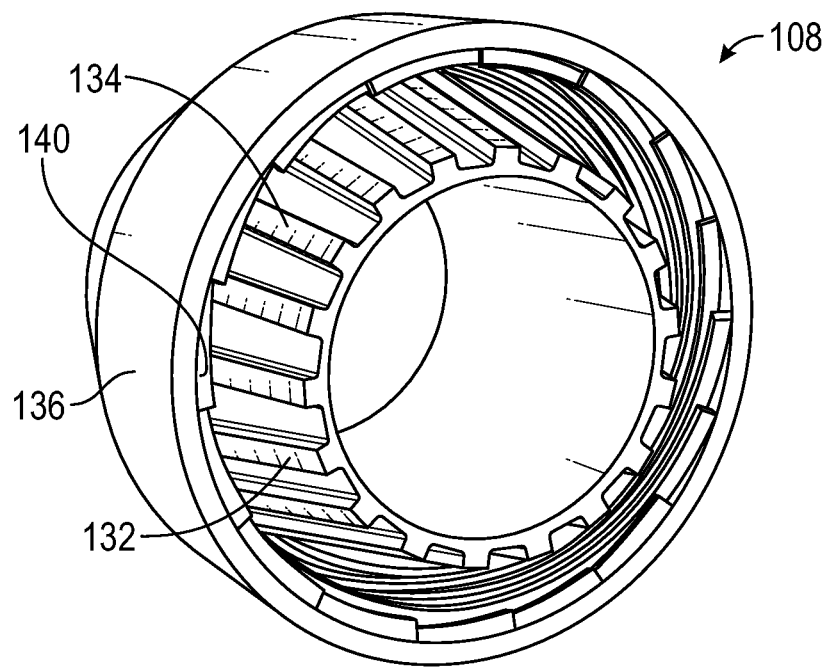
FIG. 5 is a pin end of the pipe segment of FIG. 3, according to one or more embodiments.

Referring now to FIG. 5, the pin end 108 may be configured for stabbing into the box end 106, preventing relative rotation between the two pipe segments 100, and grasping the box end 106 of the connected pipe segment to pull or hold the two pipe segments together and resist tensile forces. As shown in FIG. 7, for example, the pin end 108 may extend from the body portion 104 of the pipe segment 100 and may include a circumferential rib extending radially outward from the outer surface (note this is best shown as rib 224 in FIG. 7, but is present on the pin end 108 as well). The rib may be substantially rectangular when viewed in cross-section and may define an annularly shaped sealing surface adapted to abut and seal against the annular surface 112 of the receiving portion. (Again, this is best shown as sealing surface 226 in FIG. 7, but is present on the pin end 108 as well) The sealing surface may have an inner diameter that is the same or similar as the outer diameter of the body portion and may have an outer diameter that is the same, similar, or slightly larger than the outer diameter of the annular surface on the box end. The cross-sectional shape of the rib may also define an annularly shaped bearing surface on a proximal side of the rib for pressing engagement by a collar. (This is best shown as bearing surface 228 in FIG. 7, but is present on pin end 108 as well). The bearing surface may include an inner diameter that is the same or similar as the outer diameter of the body portion 104 and may have an outer diameter selected to create a ledge or pressing surface for the collar.

The rib may give way distally (e.g., toward the end of the pipe segment) to a cylindrical insert portion (best shown as cylindrical insert portion 230 in FIG. 7) and then to a tapered portion 132. The cylindrical insert portion may have a substantially constant diameter that is the same or similar to the body portion outer diameter and the cylindrical portion may form a cylindrical stub for engaging the receiving portion 114. The tapered portion 132 may extend further distally from the cylindrical portion and may have an outer diameter at a proximal end that is the same or similar to the cylindrical portion and may taper linearly when viewed in cross-section down to a smaller diameter at the distal end. The amount of taper may be selected to substantially match the amount of taper of the receiving portion 114 of the box end 106 to provide for seated engagement of the pin end 108 into the box end 106. The outer surface of the tapered portion 132 of the pin end may include a surface pattern adapted to resist twisting of one pipe segment relative to a connected pipe segment. As shown, the outer surface of the tapered portion may include a plurality of alternating spline ribs and slots 134, extending axially along the outer surface that are sized, shaped, and spaced to engage spline slots and ribs 116, of the receiving portion 114. In one or more embodiments, the spline ribs may include a relatively pointed tip near a distal end of the pipe segment 100 and get wider as the rib extends proximally along the length of the tapered portion of the pin end 108. The pointed tips of the spline ribs may be adapted to more quickly and efficiently engage the spline slots on the receiving portion 114 that may have relatively wide mouths at a distal end of the adjoining segment of pipe.

The rib, cylindrical insert portion, and tapered portion 132 may function to engage the receiving portion 114 of a box end 106 of a pipe segment and establish a seated engagement that is resistant to relative rotation of the two connected pipe segments 100. For purposes of holding the two pipe segments together along a longitudinal axis, a collar 136 may be provided.

Figure 6:
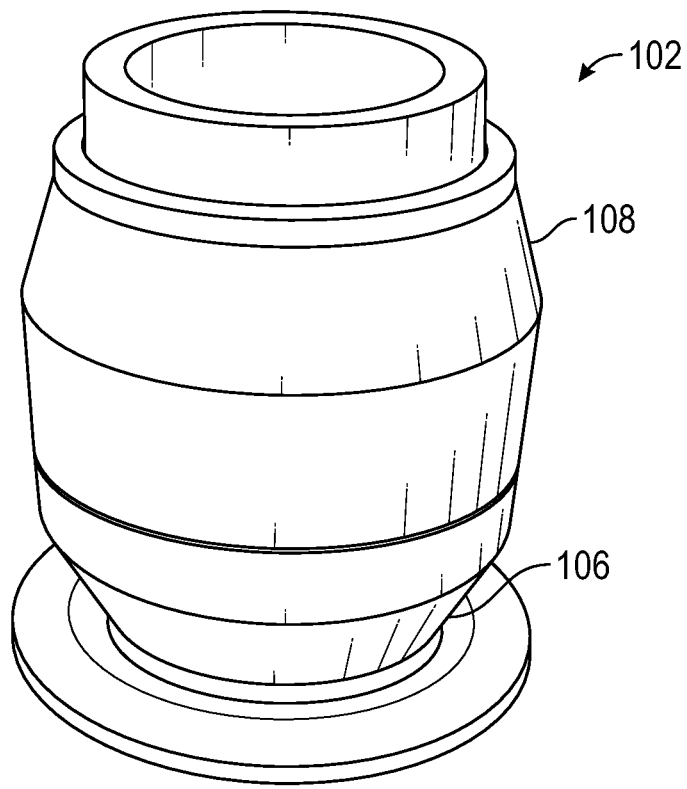
FIG. 6 is a quick coupling joint showing a made up connection between a box end and a pin end of respective pipe segments, according to one or more embodiments.

As shown in FIGS. 5, 6, and 7, the collar 136/236 may be arranged around the body portion 104 of the pipe segment. The collar 136/236 may be configured for rotation about the cylindrical and tapered portions of the pin end. That is, the collar 136/236 may be substantially fixed longitudinally, but may be free to rotated about and relative to the cylindrical and tapered portions. Alternatively, the collar 136/236 may be configured for sliding engagement along the pipe segment 100 toward and/or away from the pin end 108. The collar may include an internal pressing surface (best shown as surface 238 in FIG. 7, but present on pin end 108 as well) for pressing on the bearing surface of the rib and driving the pin end 108 of the pipe segment 100 into the box end 106 of an adjoining pipe segment 100. The pressing surface may include an internal annular surface sized and shaped to engage the bearing surface on the back side of the rib of the pin end 108. The collar 136 may develop its driving force by engaging the threads or other engagement feature on the engagement portion 110 of the box end 106. That is, as shown, the collar 136 may include a shell portion extending distally beyond the pressing surface and creating a substantially annular channel surrounding the tapered portion 132 of the pin end 108 for receiving the box end 106 of an adjoining pipe segment 100. The shell may be, for example, a bell-shaped shell. The shell may include an engagement feature 140/220 on an inside surface thereof that is particularly adapted to engage a corresponding engagement feature on the outside surface of the box end 106. In one or more embodiments, as shown in FIGS. 4 and 5, the engagement feature may include threading allowing the collar 136 to be spun or rotated relative to the two pipe segments and drawing the pipe segments together. In another embodiment, as shown for example in FIG. 7, the engagement feature may include a union type locking coupling. That is, as shown, the inside surface of the collar 236 may include a plurality of locking lugs 220 adapted to be passed between corresponding locking ribs 218 on the engagement portion of the box end 206. Rotation of the collar 236 may cause the lugs 220 to pass behind (beneath in FIG. 7) the locking ribs 218 causing resistance to longitudinal separation of the pipe segments 100. A detent or other securing feature may be provided to prevent inadvertent rotation of the collar 236 such that the locking lugs and ribs of the union type locking coupling remain engaged. For that matter, a locking feature may be used with the described threaded embodiment as well.

In operation and use, a method 300 of coupling pipe segments or pipe stands may include stabbing a pin end of a pipe segment into a box end of another pipe segment (302). Stabbing the pin end into the box end may include aligning splines ribs on the pin end with spline slots on the receiving portion of the box end (304) and seating the pin end into the box end thereby establishing rotational resistance in the joint (306). In one or more embodiments, the stabbing operation may be part of a stand building process where pipe segments are secured to one another to build a pipe stand including 2, 3, or more pipe segments. In other embodiments, the stabbing operation may be part of a tripping operation or drilling operation where a pipe segment or a pipe stand is added or removed from a drill string extending down a well. In either case, the free pipe that is being stabbed may be carried by, for example, a top drive on a drill rig, a pipe elevator, or a combination of a top rive and a pipe elevator. The carrying element may lift the pipe segment or stand from the box end of the pipe, align the pin end with a box end of an adjoining pipe and lower the pin end into the box end of the adjoining pipe. The method may also include securing a collar across the joint (308). Securing the collar may include advancing the collar on the pin end onto an engagement portion of the box end (310). Where the collar is substantially fixed longitudinally, this may occur naturally as the pin end is stabbed into the box end. Where the collar is moveable longitudinally, the collar may be advanced apart from the stabbing operation. Securing the collar may also include rotating the collar relative to the two pipe segments to longitudinally engage the two pipe segments by pressing on a bearing surface of the pin end based on a threaded or union type coupling of the collar with the engagement portion of the box end (312). The method may also include threadingly engaging the collar with the engagement portion of the box end (314) and/or engaging the engagement portion of the box end with a union type engagement on the collar 316. The rotation of the collar may be performed using an iron roughneck, for example, on a drill floor of a drill rig.

Although a flowchart or block diagram may illustrate a method as comprising sequential steps or a process as having a particular order of operations, many of the steps or operations in the flowchart(s) or block diagram(s) illustrated herein can be performed in parallel or concurrently, and the flowchart(s) or block diagram(s) should be read in the context of the various embodiments of the present disclosure. In addition, the order of the method steps or process operations illustrated in a flowchart or block diagram may be rearranged for some embodiments. Similarly, a method or process illustrated in a flow chart or block diagram could have additional steps or operations not included therein or fewer steps or operations than those shown. Moreover, a method step may correspond to a method, a function, a procedure, a subroutine, a subprogram, etc.

As used herein, the terms "substantially" or "generally" refer to the complete or nearly complete extent or degree of an action, characteristic, property, state, structure, item, or result. For example, an object that is "substantially" or "generally" enclosed would mean that the object is either completely enclosed or nearly completely enclosed. The exact allowable degree of deviation from absolute completeness may in some cases depend on the specific context. However, generally speaking, the nearness of completion will be so as to have generally the same overall result as if absolute and total completion were obtained. The use of "substantially" or "generally" is equally applicable when used in a negative connotation to refer to the complete or near complete lack of an action, characteristic, property, state, structure, item, or result. For example, an element, combination, embodiment, or composition that is "substantially free of" or "generally free of" an element may still actually contain such element as long as there is generally no significant effect thereof.

In the foregoing description various embodiments of the present disclosure have been presented for the purpose of illustration and description. They are not intended to be exhaustive or to limit the invention to the precise form disclosed. Obvious modifications or variations are possible in light of the above teachings. The various embodiments were chosen and described to provide the best illustration of the principals of the disclosure and their practical application, and to enable one of ordinary skill in the art to utilize the various embodiments with various modifications as are suited to the particular use contemplated. All such modifications and variations are within the scope of the present disclosure as determined by the appended claims when interpreted in accordance with the breadth they are fairly, legally, and equitably entitled.

What is claimed is:

1. A quick connect pipe connection for drill pipe; comprising:
    a box end having an annular end surface that gives way internally to a receiving portion and externally to an engagement portion, wherein the receiving portion comprises a plurality of alternating spline slots and ribs extending substantially longitudinally and the engagement portion comprises an engagement feature on an outer surface thereof in the form of a union type connection feature; and
    a pin end configured for rotationally and longitudinally engaging the box end, the pin end comprising:
        a circumferential rib defining an annularly shaped sealing surface adapted to abut and seal against the annular end surface of the box end; and
        a tapered portion distal to the circumferential rib and configured for longitudinal insertion into the receiving portion and resisting relative rotation between the box end and the pin end, wherein the tapered portion comprises a plurality of alternating spline slots and ribs configured for engaging the spline slots and ribs of the receiving portion, the plurality of alternating spline slots and ribs extending along a full length of the tapered portion; and
    a collar configured for sleeving over the engagement portion of the box end and resisting relative longitudinal motion between the box end and the pin end.

2. The pipe connection of claim 1, wherein the collar comprises engagement features on an interior surface thereof for engaging the engagement feature on the outer surface of the engagement portion.

3. The pipe connection of claim 1, wherein the collar is fixed longitudinally and freely rotatable relative to the tapered portion.

4. The pipe connection of claim 1, wherein the box end is bell-shaped.

5. The pipe connection of claim 4, wherein the collar is bell-shaped and sized to envelope the box end.

6. The pipe connection of claim 1, wherein the receiving portion comprises a linearly tapering bore from an end of the pipe segment to an interior side of the box end.

7. A quick connect drill pipe, comp
   a body portion having an interior lumen;
   a box end secured at a first end of the body portion; and
   a pin end secured to a second end of the body portion opposite the first end;
   wherein:
   the box end comprises an annular end surface that gives way internally to a receiving portion and externally to an engagement portion, wherein the receiving portion comprises a plurality, of alternating spline slots and ribs extending substantially longitudinally and the engagement portion comprises an engagement feature on an outer surface thereof in the form of a union type connection feature; and
   the pin end is configured for rotationally and longitudinally engaging an adjoining drill pipe that is configured similar to the quick connect drill pipe, the pin end comprising:
      a circumferential rib defining an annularly shaped sealing surface adapted to abut and seal against the annular end surface of the box end; and
      a tapered portion distal to the circumferential rib and configured for longitudinal insertion into a receiving portion of the adjoining drill pipe and resisting relative rotation between the quick connect drill pipe and the adjoining drill pipe, wherein the tapered portion comprises a plurality of alternating spline slots and ribs configured for engaging spline slots and ribs of the receiving portion of the adjoining drill pipe, the plurality of alternating spline slots and ribs extending along a full length of the tapered portion; and
   a collar configured for sleeving over an engagement portion of a box end of the adjoining drill pipe and resisting relative longitudinal motion between the quick connect drill pipe and the adjoining drill pipe.

8. The pipe of claim 7, wherein the collar comprises engagement features on an interior surface thereof for engaging engagement features on an outer surface of the box end of the adjoining drill pipe.

9. The pipe of claim 7, wherein the collar is fixed longitudinally and freely rotatable relative to the tapered portion.

10. The pipe of claim 7, wherein the box end of the quick connect drill pipe is bell-shaped.

11. The pipe of claim 10, wherein the collar is bell-shaped and sized to envelope the box end of the adjoining drill pipe.

12. A method of connecting drill pipe on a drill rig, the method comprising:
    stabbing a pin end of the quick connect drill pipe of claim 7 into a box end of the adjoining drill pipe of claim 7 thereby advancing the collar of the quick connect drill pipe over the box end of the adjoining drill pipe; and
    rotating the collar to secure the quick connect drill pipe to the adjoining drill pipe.

13. The pipe connection of claim 7, wherein the receiving portion comprises a linearly tapering bore from an end of the pipe segment to an interior side of the box end.

* * * * *